July 23, 1957     H. W. EHLER     2,799,942
UNITARY RULE SLIDE
Filed Dec. 10, 1954

INVENTOR,
HERMAN W. EHLER,
By
Attorney

United States Patent Office 2,799,942
Patented July 23, 1957

2,799,942

UNITARY RULE SLIDE

Herman W. Ehler, Garden City, N. Y., assignor to General Hardware Mfg. Co., Inc., New York, N. Y., a corporation of New York Application December 10, 1954, Serial No. 474,352

2 Claims. (Cl. 33—173)

The present invention relates to rules, caliper rules, trammels and the like and more particularly to the slide component thereon.

An object of this invention is to provide a rule slide of novel and improved construction, made of a flat blank bent in simple manner to afford not only a channel for the rule to slide in, but also tabs which overlay the rule and hold it within the channel; such tabs automatically assuming their required position upon the making of bends in other parts of the slide blank during its manufacture, to form said channel only.

Another object hereof is to provide a rule slide of novel and improved construction, which is cheap and easy to manufacture and efficient in use.

Other objects and advantages will become apparent as this disclosure proceeds.

In the accompanying drawings forming part of this specification, similar characters of reference indicate corresponding parts in all the views. Although I have chosen a caliper rule to illustrate an adaptation of this invention, same shall serve as a mere example and in no manner restrictive as to the use of my present invention.

Figure 1:
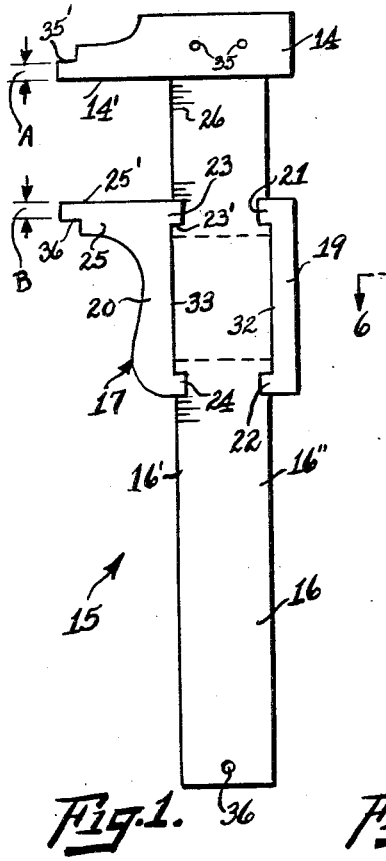
Fig. 1 is a front view of a caliper rule whose slide component embodies the teachings of this invention.
Figures 2, 3:
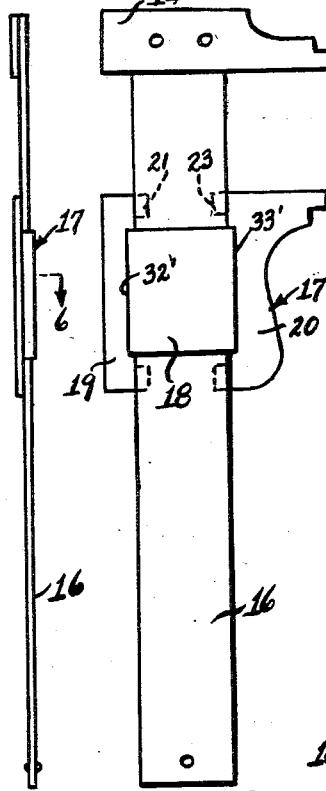
Fig. 2 is an end view of Fig. 1.
Fig. 3 is a rear view of Fig. 1.

In the drawings, the numeral 15 designates generally a caliper rule comprising a straight rule 16 having a fixed anvil or jaw 14 extending laterally thereof at one of its ends. The numeral 17 designates generally the slide member which rides on said straight rule 16. This slide comprises an open channel 18 which receives the straight rule 16 therethrough. The outward flanges 19 and 20 of said channel from which extend the tabs 21, 22, 23, 24, are coplanar with each other and with said tabs. It is to be noted that all said tabs overhang the straight rule 16, thereby holding the straight rule within said channel. Flange 20 is formed with an extending part 25 which serves as the second anvil or jaw of the caliper rule 15. Edges 14' and 25' are perpendicular to edges 16', 16" of the straight rule 16 and so are all the side edges of all said tabs. At least edge 16', in the embodiment shown carries graduations indicated in part at 26 of any required system of length measurements.

Figures 6, 7:
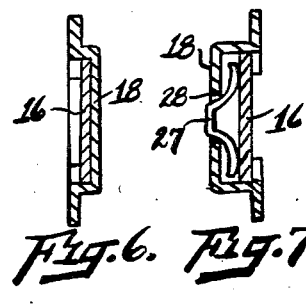
Fig. 6 is an enlarged section taken at the lines 6—6 in Fig. 2.
Fig. 7 is an enlarged section taken at the lines 7—7 in Fig. 5.

The slide 17 is in slidable fit on the rule 16 and is free of wobble thereon, either because of the dimensions of said channel 18 or the provision of a blade spring 27 positioned as in Fig. 7 and held in hole 28 through the channel wall.

Figures 4, 5:
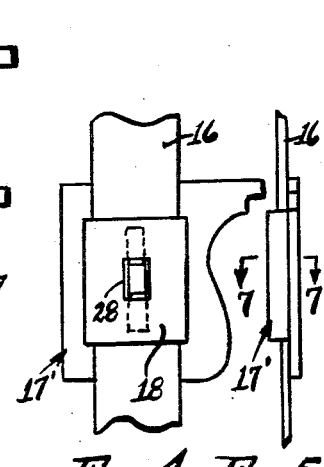
Fig. 4 is a fragmentary rear view of said caliper rule, of slightly modified construction.
Fig. 5 is a fragmentary end view of Fig. 4.
Figure 8:
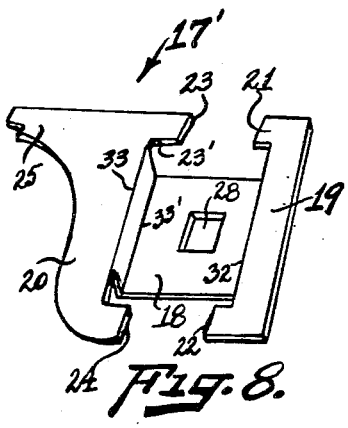
Fig. 8 is an enlarged perspective view of the slide.
Figure 9:
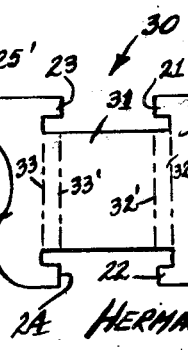
Fig. 9 is an enlarged perspective view of a spring element used in the embodiment of Fig. 4.
Figure 10:
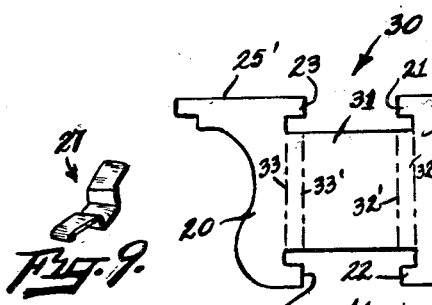
Fig. 10 shows the flat blank used for making the slide and indicates the bend lines for forming the slide to be ready for use on the rule.

The slide 17 is made of a single flat blank 30, which is comprised of a central section 31 between end sections, one of which is the flange 19 and its tabs 21, 22 and the other of which is the flange 20 with its tabs 23, 24. It is to be noted that the boundary line 32 between the sections 31 and 19, is a straight line and that the boundary line 33 between the sections 20 and 31 is also a straight line; both said boundary lines being parallel to each other and perpendicular to edge 25'. It is evident that all the tabs extend to points respectively which are between said boundary lines 32, 33 and that the distance between such boundary lines is such as to furnish sufficient material to form the channel 18. Hence, the parallel lines 32, 32', 33', and 33 indicate the bend lines in the central section 31 for forming the channel 18. Upon forming such channel, the flanges 19 and 20 will be coplanar and of course all the tabs 21, 22, 23, 24 will automatically assume coplanar relationship with said flanges. The slide 17 is thus completed and ready for use upon subjecting only the central section 31 of the blank 30 to a single simple stamping operation to form said channel 18. For the modified embodiment 17' shown in Fig. 4 the dimensions of the central section of the blank need of course be suitable to include the spring 27 in the assembly as shown in Fig. 7 and hole 28 provided therefor as shown in Fig. 8.

As is usual in this type of measuring tool, the dimension of an article placed between and in contact with the edges 14', 25', is read directly on the scale of graduations 26 along edge 16' of the straight rule 16; line 14' being at zero on such scale. It is also usual to provide the jaw 14 and 25 with steps at their extremities to present the parallel edges 35 and 36 respectively, perpendicular to edge 16' of the rule. The distance between these edges 35, 36 is for inside measurements and may be read directly on the scale on the straight rule 16, along the line of edge 23' of the tab 23, if the width of such tab is made so that it equals the sum of the widths indicated by the dimensions "A" and "B" shown in Fig. 1.

All the parts of this measuring instrument may be made of a single sheet steel stock whereby its manufacture is very economical. Jaw member 14 may be secured to rule 16 by rivets 35 or in other manner and a stop rivet 36 at the free end of said rule may be provided as a stop to prevent removal of the slide 17.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. A rule slide of the character described, formed of a single blank of sheet material comprising a central section intermediate two end sections; the boundary lines between such sections being straight and parallel; each end section having at least one tab extending therefrom free of the intermediate section and across one of said boundary lines respectively; said end sections and tabs being substantially coplanar and the entire intermediate section being in the form of a channel along and entirely between the end sections; said channel being to one side of the plane of the end sections; said end sections constituting lengthwise flanges on said channel, extending in opposite directions therefrom respectively, each laterally of and away from said channel.

2. A rule slide as defined in claim 1, wherein there are two tabs extending from each end section respectively; the whole of said intermediate section being between said tabs.

References Cited in the file of this patent

UNITED STATES PATENTS

| | | |
|---|---|---|
| 734,014 | Traut | July 21, 1903 |
| 1,200,598 | DeRoy | Oct. 10, 1916 |

FOREIGN PATENTS

| | | |
|---|---|---|
| 50,668 | Germany | Feb. 5, 1890 |
| 91,605 | Switzerland | Nov. 16, 1921 |
| 408,487 | Germany | Jan. 19, 1925 |
| 663,320 | Germany | Aug. 3, 1938 |